US006578472B1

United States Patent
Ribera Castella

(10) Patent No.: US 6,578,472 B1
(45) Date of Patent: Jun. 17, 2003

(54) MACHINE FOR OPENING PISTACHIOS

(75) Inventor: José Luis Ribera Castella, Torrebesses (ES)

(73) Assignee: Casa Sant Roc, S.L. (ES)

( * ) Notice: Subject to any disclaimer, the term of this patent is extended or adjusted under 35 U.S.C. 154(b) by 0 days.

(21) Appl. No.: 10/285,846

(22) Filed: Oct. 30, 2002

(30) Foreign Application Priority Data

Mar. 12, 2002 (ES) .......................................... 200200586

(51) Int. Cl.⁷ ................................................. A23N 5/00
(52) U.S. Cl. .......................... 99/571; 99/568; 99/574; 99/579; 99/580; 99/581
(58) Field of Search .......................... 99/568, 571–582, 99/617–622, 518, 519; 426/481–485; D7/680; 30/120.1–120.5

(56) References Cited

U.S. PATENT DOCUMENTS

| | | | | |
|---|---|---|---|---|
| 2,321,795 A | * | 6/1943 | Buckman .................. 99/568 X |
| 2,954,810 A | * | 10/1960 | Bond ....................... 99/582 X |
| 4,196,224 A | * | 4/1980 | Falk ........................... 426/483 |
| 4,201,126 A | * | 5/1980 | Evans .......................... 99/574 |
| 4,307,660 A | * | 12/1981 | Clavel ......................... 99/574 |
| 4,397,228 A | * | 8/1983 | Thornton ................. 99/576 X |
| 4,819,331 A | * | 4/1989 | Joyama .................... 30/120.2 |
| 5,024,148 A | * | 6/1991 | Moses .......................... 99/618 |
| 5,697,292 A | * | 12/1997 | Simmons ..................... 99/574 |
| 5,711,212 A | * | 1/1998 | Lemos ..................... 99/571 X |
| 6,205,915 B1 | * | 3/2001 | Quantz ........................ 99/571 |
| 6,209,448 B1 | * | 4/2001 | Hagen ......................... 99/575 |
| 6,270,824 B1 | * | 8/2001 | Quantz ....................... 426/482 |

* cited by examiner

Primary Examiner—Timothy F. Simone
(74) Attorney, Agent, or Firm—Ostrolenk, Faber, Gerb & Soffen, LLP

(57) ABSTRACT

Machine for opening pistachios, a reservoir containing pistachios, a device for opening pistachios, and a device for supplying pistachios from the container to the opening device. The opening device includes a rotary shaft which carries a coaxial disk equipped on its periphery, with a plurality of chambers, each of a size to accommodate a pistachio. During the rotation of the shaft, these chambers can be consecutively placed opposite the supply device and opposite a breaker piston.

17 Claims, 5 Drawing Sheets

MACHINE FOR OPENING PISTACHIOS

SUBJECT OF THE INVENTION

The present invention relates to a machine for opening pistachios by means of the forced opening of the shell halves along the natural opening lines.

The invention concerns a machine comprised of a reservoir containing pistachios, an opening device, and a device for supplying pistachios from the reservoir to the opening device, in which a controlled pressure is exerted on the pistachio, giving rise to its opening along the natural sutures of the shell halves.

BACKGROUND OF THE INVENTION

The pistachio is a fruit whose greatest commercial value is when it is eaten roasted and salted, but with the halves of the shell open, so that it is easier for the consumer to shell the nut.

Fifty percent of the pistachio harvest opens naturally on the tree, and therefore, once selected, roasted, and salted, they can be marketed directly.

The remainder of the harvest, i.e. the other 50%, consists of closed fruits which, owing specifically to the fact that they are closed, cannot be marketed directly as a snack. They are used to produce pistachio seed by a shelling process, and for other less profitable commercial purposes, which represents a significant loss of the harvest's commercial value.

Traditionally, pistachios have been opened manually, with the concomitant increase in costs for manpower.

Moreover, mechanical opening of the pistachio has to produce a natural-opening impression, and it therefore has to be limited and along the sutures of the shell halves.

DESCRIPTION OF THE INVENTION

The machine for opening pistachios which the invention proposes solves the abovementioned problem in such a manner that it is possible to open the pistachios by producing an opening similar to that of the open pistachio on the tree in natural form.

To this end, and more specifically, the machine comprises a reservoir containing pistachios, a device for opening pistachios, and a device for supplying pistachios from the reservoir container to the opening device. The reservoir container has means for controlling the arrival of the pistachios at the supply device, and the supply device starts from the reservoir and has means for supplying the pistachios individually to the opening device.

The opening device comprises a rotary shaft which carries coaxial disks equipped at their peripheries with chambers, each of a size for axially accommodating one pistachio. During rotation of the shaft, it is possible, for these chambers to be placed consecutively opposite the supply device and then opposite a breaker piston. Stops are generated during rotation of the shaft at the abovementioned positions in which the chambers are opposite the supply device and the breaker piston.

The reservoir containing the pistachios is located above the opening device. On its inside, the reservoir has two transverse surfaces with a vertical inclination in different directions and located at different heights. An opening is defined between the two surfaces for the metered passage of the pistachios. The lower surface defines the bottom of the reservoir. A chamber is delimited between both surfaces, from which the supply device starts.

The supply device is formed of a tube, with an internal section substantially greater than the maximum transverse section of the pistachios. Via the tube, the pistachios slide under gravity to the opening device. The tube starts from the chamber defined between the two inclined surfaces of the reservoir and has an outer sleeve which can be moved axially over the tube in a reciprocating movement, which causes a vibration which facilitates the entry of the pistachios into the tube. A double-door system retains each pistachio at the exit from the tube and deposits a pistachio in each radial chamber of the opening device. A pneumatic system clears any jams produced by the pistachios inside the tube.

The upper end of the axially movable outer sleeve is bell-mouthed to facilitate entry of the pistachios. A cooperating flexible tongue impedes the entry of pistachios into the tube when the sleeve is in its upper limit position. Provision is made for the upper end of the tube to be cut in oblique section. The location of the flexible tongue coincides with the lower portion of the oblique section.

In order to clear any jams, the machine for opening pistachios has a pneumatic system comprising a pair of orifices, one in the outer sleeve coinciding with a longitudinal groove in the wall of the tube, and the other at the exit from the tube. Via the orifices and the grooves, pressurized air is injected in order to expel a jammed pistachio toward the reservoir container. The pneumatic system is activated by activation of a sensor located in the opening device which detects that the radial opening chamber is empty.

DESCRIPTION OF THE DRAWINGS

To supplement the description which is being given, and with the aim of assisting better comprehension of the characteristics of the invention, in accordance with a preferred practical illustrative embodiment thereof, a set of drawings is appended, as an integral part of said description, in which the following has been reproduced in an illustrative and non-limiting manner.

PREFERRED EMBODIMENT OF THE INVENTION

Figure 1:
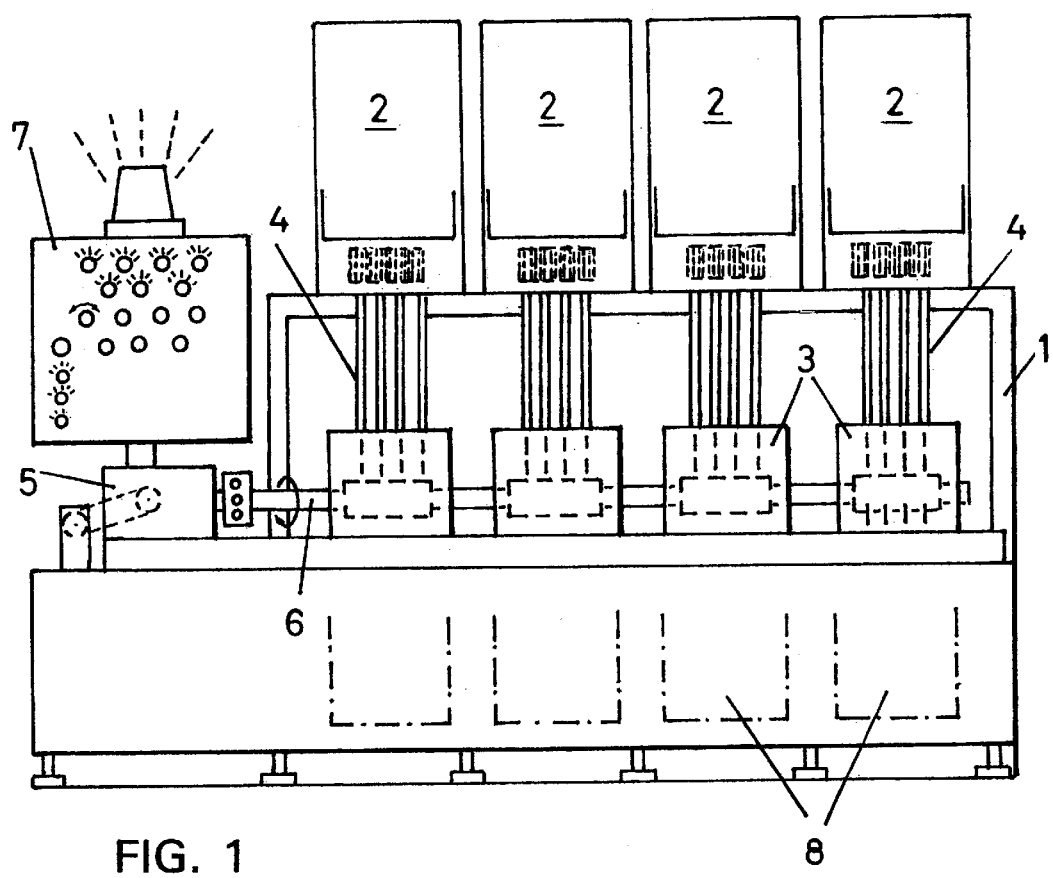
FIG. 1 shows a diagrammatic general view of the machine, with four opening modules shown.
Figure 2:
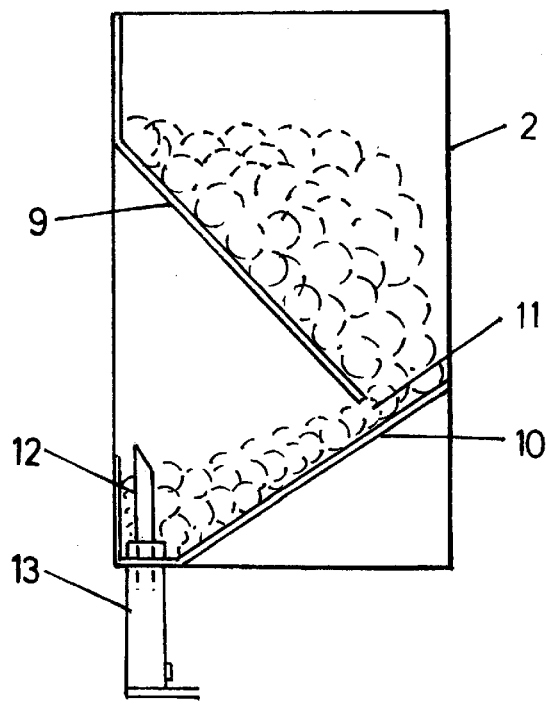
FIG. 2 shows a transverse section of one of the reservoirs containing pistachios.
Figure 3:
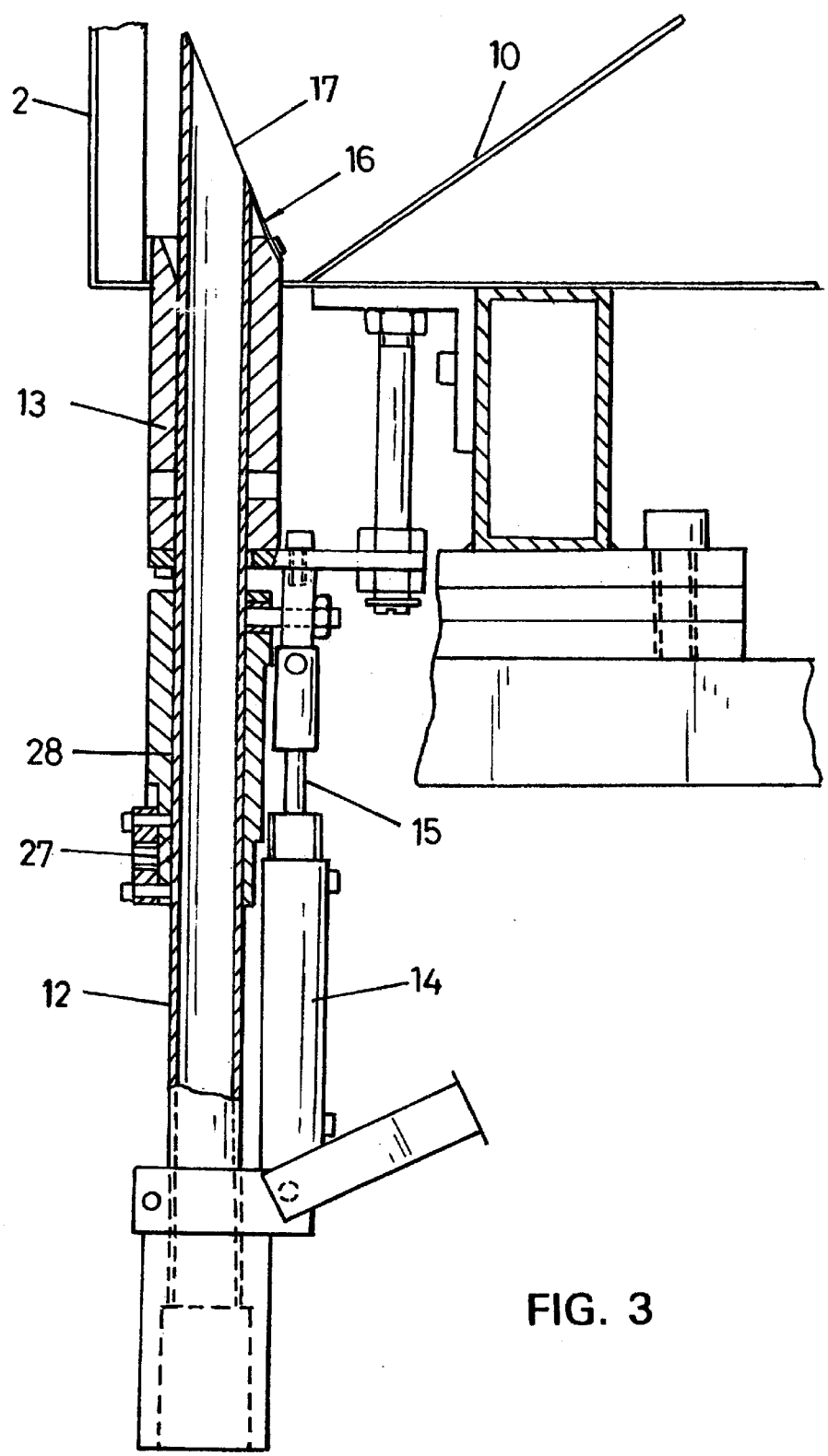
FIG. 3 shows a transverse section of one of the devices for supplying pistachios, in which it is possible to observe the tube and the axially movable outer sleeve.
Figure 4:
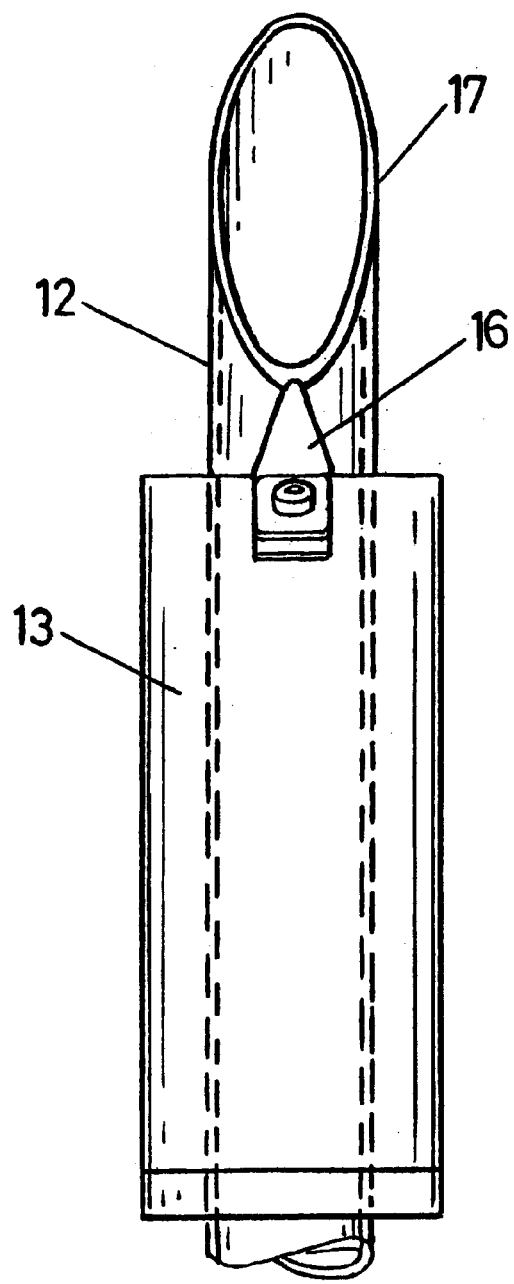
FIG. 4 shows a detailed elevation of the upper end of the tube making up the supply device.
Figure 5:
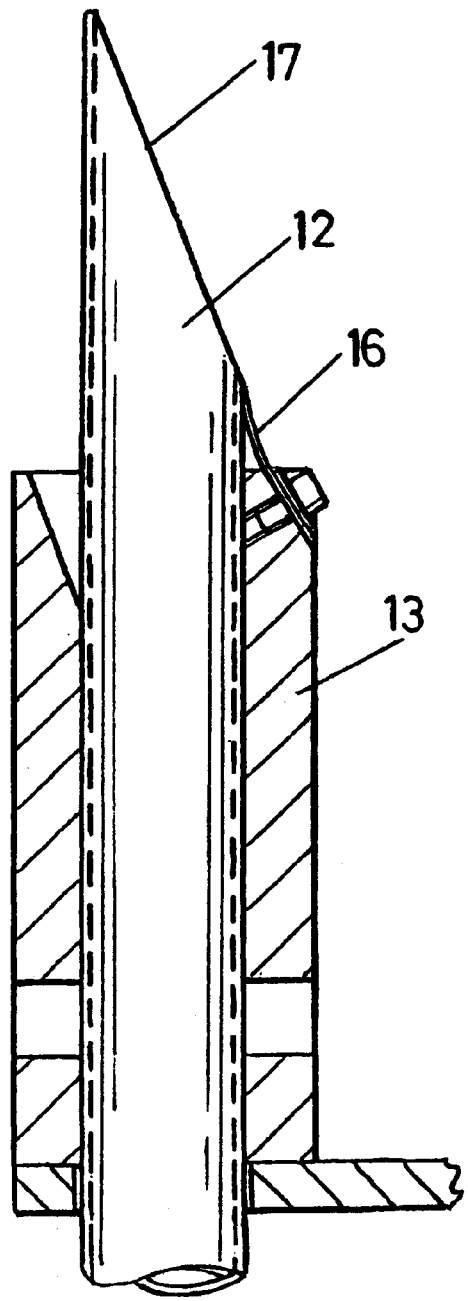
FIG. 5 shows a detailed profile of the upper end of the tube with the outer sleeve sectioned.

The drawing Figures, particularly FIG. 1, show a machine for opening pistachios. The present practical illustrative embodiment, has four opening units or modules supported by a general frame structure (1). Each opening unit or module is comprised of a reservoir (2) containing pistachios, an opening device (3), and a device (4) for supplying pistachios from the reservoir container (2) to the opening device (3).

As is explained below, the device (4) for supplying pistachios, in the present practical illustrative embodiment, is comprised of four identical supply devices, each equipped with means for supplying the pistachios individually to the opening device (3). It is possible to vary the number of devices as a function of the desired performance level.

The opening device (3) is actuated by a motor (5) which intermittently causes a shaft (6) to rotate.

All operations of the machine are governed by a control panel (7) and a pneumatic system (not shown) which actuates the various elements.

Once open, the pistachios are deposited under gravity in containers 8) located under the opening devices (3).

Each reservoir container (2), which contains the closed pistachios, is located above its opening device (3), and it has means for controlling the arrival of the pistachios to the supply device (4).

That means comprises two inner surfaces, an upper one (9) and a lower one (10), arranged transversely and oriented with a vertical inclination in different directions and located at different height. They are located to define an opening (11) between both of the surfaces for the metered passage of the pistachios. The lower surface (10) defines the bottom of the reservoir. A chamber is delimited between both surfaces, from which the supply device (4) starts.

As indicated above, the supply device (4) is comprised, in the present illustrative embodiment, of four supply devices, each formed by a tube (12) with an internal section substantially greater than the maximum transverse section of the pistachios, and via which tube the pistachios slide under gravity toward the opening device (3).

The tube (12) has an outer sleeve (13) which can be moved axially over the tube (12) in a reciprocating movement for causing vibration which facilitates the entry of the pistachios into the tube (12).

Reciprocating movement of the sleeve (13) is produced by a pneumatic cylinder (14) having a piston (15) which alternately moves the sleeve (13) to which it is articulated. In order to facilitate maintenance and repair of the supply device, the sleeve (13) is divided transversely into two portions which are joined together.

The upper end of the outer sleeve (13), which emerges slightly from the bottom of the reservoir container (2), is bell-mouthed in order to facilitate the entry of the pistachios, with the cooperation of a flexible tongue (16) located in an oblique position at the edge of the sleeve (13), and which impedes the entry of the pistachios into the tube (12) when the sleeve (13) is in its upper limit position.

Similarly, the upper end of the tube (12) is cut in an oblique section (17). The location of the flexible tongue (16) coincides with the lower portion of the oblique section (17).

Figure 6:
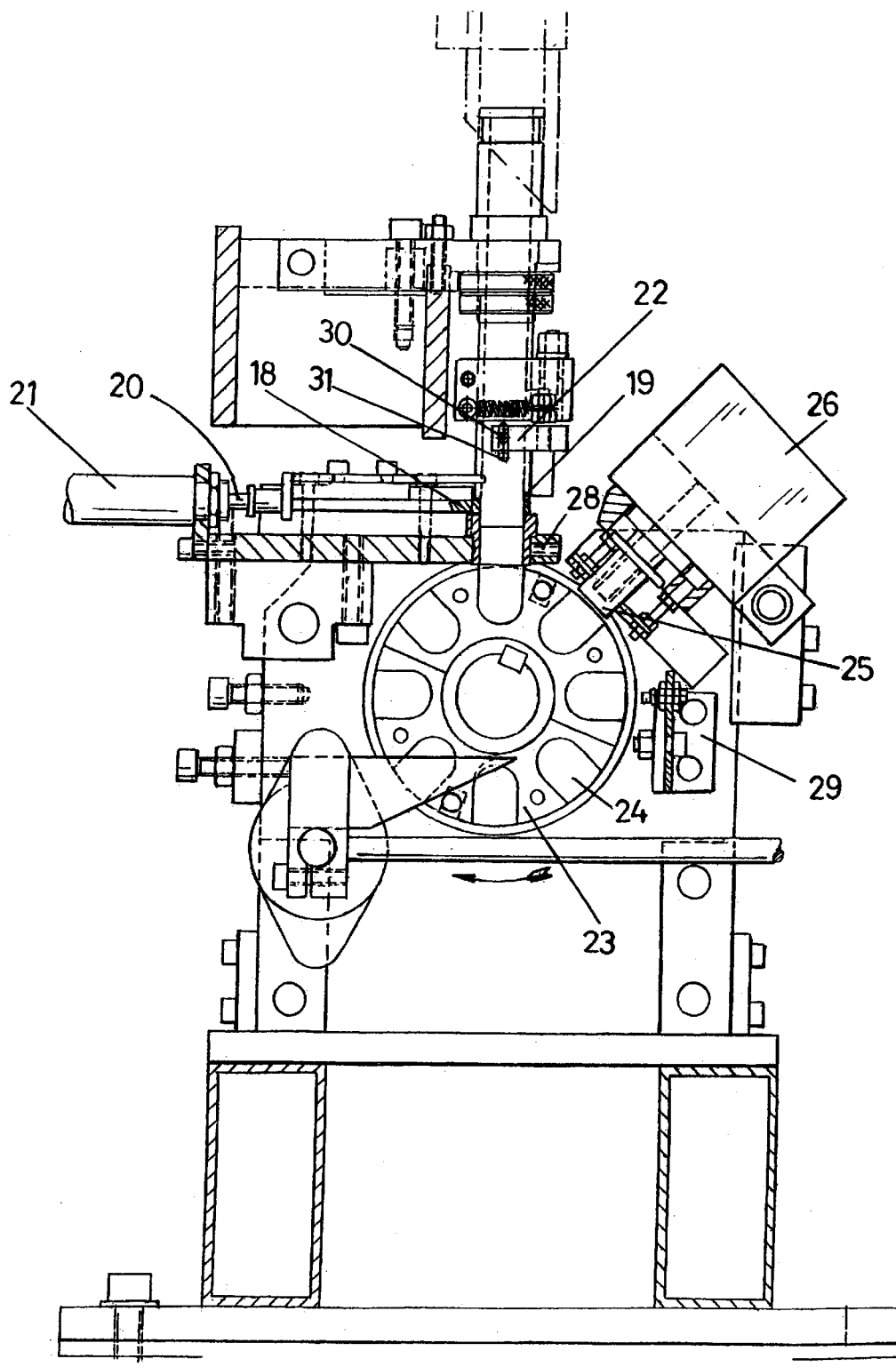
FIG. 6 shows a transverse section of the device for opening pistachios, in which it is possible to observe the disk with its corresponding radial opening chambers and the arrangement of the breaker piston.
Figure 7:
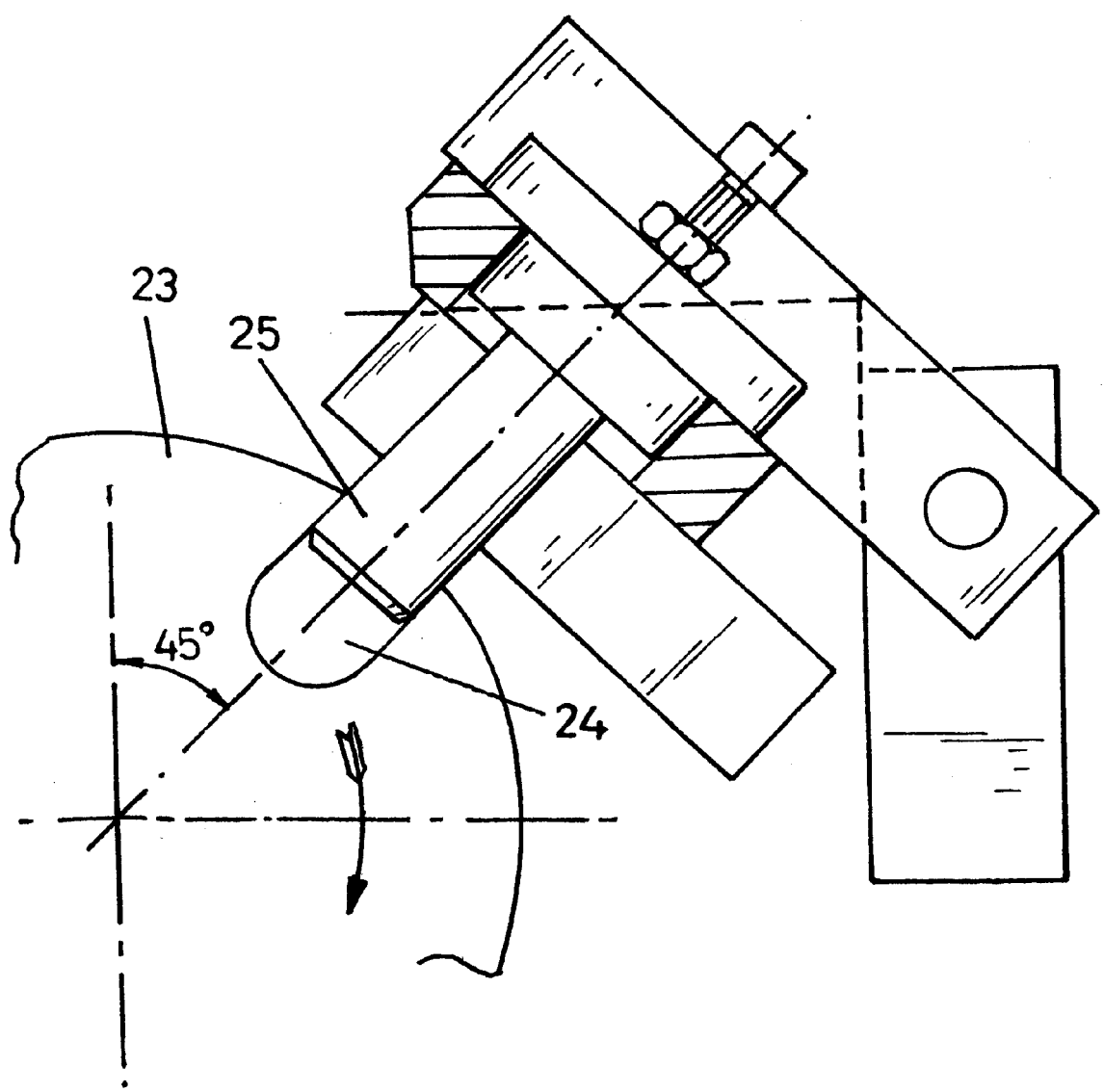
FIG. 7 shows a detailed view of the breaker piston acting on a radial opening chamber.

The supply device (4) has means for supplying the pistachios individually to the opening device (3). This is comprised of a double door for retaining each pistachio at the exit from the tube (12). In FIG. 6, one of the doors is arranged at the exit from the tube (12) and is comprised of a plate (18) provided with an orifice (19) which coincides with the axial axis of the tube (12) in the open position. The plate (18) is moved longitudinally and in a direction perpendicular to the axis of the tube (12), actuated by the piston (20) of the pneumatic cylinder (21).

Another door is spaced above the plate (18) at a distance greater than the maximum length of a pistachio. It is embodied by articulated jaws (22) mounted on the tube (12). The jaws (22) have individual spikes (30), at their free ends, which traverse the walls of the tube (12) via the orifices (31). Actuation of the jaws (22) is mechanically synchronized with movement of the plate (18) so that one opens when the other closes, allowing the passage of individual pistachios to the portion of the tube included between the two doors.

The opening device 3 is at the exit from the tubes (12), after the doors comprised of the plates (18). The opening device (3) is comprised of the rotary shaft (6) which carries four coaxial disks (23) for each opening module or unit, in accordance with the practical illustrative embodiment.

Each coaxial disk (23) is equipped in from its periphery with a plurality of radial opening chambers (24), each of a size to axially accommodate one pistachio. Eight radial opening chambers (24) distributed regularly over the periphery of the coaxial disk (23) are illustrated.

During rotation of the shaft (6), these radial chambers (24) consecutively arrive opposite the supply device (4), which can deposit a pistachio in each chamber. A breaker piston (25) is located at the next rotary position, the position following the loading of the chamber. The piston 25 moves in the radial direction of the facing chamber. The shaft (6) is stopped during its rotation at the above mentioned facing positions to facilitate the entry of a pistachio into a radial opening chamber (24) and the actuation of the breaker piston (25).

Once a pistachio has been deposited in a radial opening chamber (24) opposite the supply device (4), the rotary shaft (6) rotates through 45° (the angle for eight chambers 24), placing that chamber 24 opposite the breaker piston (25) at the same time as the next radial chamber (24) moves opposite the supply device (4) in order to receive another pistachio.

When the rotary shaft (6) stops again, a pistachio is deposited in the next radial chamber (24), and the breaker piston (25) acts on the occupied chamber previously loaded. The piston is impelled by the pneumatic cylinder (26) to exert a controlled pressure on the pistachio, which partially opens the pistachio along the natural sutures of the shell halves, without breaking the pistachio.

After another pistachio has been deposited and the breaker piston (25) has been actuated in another corresponding radial chambers (24), the rotary shaft (6) rotates through a further 45° in order to repeat the same process on a continuous basis.

The opened pistachios are deposited in the container (8) located under the shaft (6). As the coaxial disks (23) rotate, the radial chambers (24) reach the lower position, and the pistachios fall under gravity.

The machine for opening pistachios has a pneumatic system for clearing any jams produced by the pistachios inside a tube (12) of the supply device (4). It is comprised of a pair of orifices, one (27) in the outer sleeve (13) to coincide with a longitudinal groove (28) in the wall of the tube (12), and the other (28a) at the exit from the tube (12), after the plate (18), through which orifices and grooves pressurized air is injected in order to expel a jammed pistachio toward the reservoir container.

Activation of the pneumatic system which injects the pressurized air is achieved by means of a sensor (29) located in the opening device (3) upon the sensor detecting that the radial opening chamber (24) opposite it is empty.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A machine for opening pistachios comprising a supply device, a supply device for supplying pistachios individually to an opening device;

an opening device comprising a rotary disc having a periphery; a plurality of chambers around the periphery, each chamber being sized for accommodating a pistachio supplied to the chamber from the supply device, with the supply device and the disc being positioned for supplying a pistachio to a first one of the chambers at a first rotary position of the disc;

a breaker piston opposed to the periphery of the disc and at a location such that the breaker piston is opposed to a chamber that has been supplied with a pistachio while another chamber is at the supply device for being supplied with a pistachio, and the breaker piston being operable into and out of the respective chamber then opposed to it for being moved into the opposed chamber to open the pistachio therein;

and a device for permitting rotation and for periodically stopping the rotation of the disc, with the stopping being at positions where one of the chambers is opposed to the supply device for receiving a pistachio while another of the chambers is opposed to the breaker piston.

2. The device of claim 1, further comprising a reservoir container fillable with pistachios and connected with the supply device for supplying pistachios to the supply device.

3. The machine of claim 2, wherein the supply device includes a supplying elements for supplying individual pistachios to the respective chambers of the disc.

4. The machine of claim 2, wherein the reservoir is located above the opening device;

first and second transversely extending surfaces, with respective vertical inclinations in different directions, located at different heights in the reservoir and shaped and positioned to define an opening between the two surfaces for enabling the metered passage of the pistachios through the opening, wherein the lower one the surfaces in the reservoir defines the bottom of the reservoir, the two surfaces delimiting a chamber between them from which the supply device starts.

5. The machine of claim 1, further comprising a rotary shaft in the machine, the disc being disposed on the rotary shaft for being rotated by the rotary shaft and the device for generating stops being connected with the shaft for controlling rotation of the shaft and the disc.

6. The machine of claim 1, wherein the supply device is opposed to one of the chambers of the disc at a first location while the breaker piston is opposed to the disc at a second location, and the first and second locations are located such that at one stop of the disc, one of the chambers may be loaded with a pistachio and at the next stop of the disc, the chamber loaded at the previous stop is opposite the breaking piston.

7. The machine of claim 1, wherein the supply device is disposed to deliver a pistachio to a then upwardly facing chamber, and the chambers are shaped with respect to a pistachio as to permit the pistachios to fall from a chamber then facing downward.

8. The machine of claim 1, wherein the supply device comprises a tube having an internal section substantially greater than the maximum transverse section of a pistachio, and pistachios slide under gravity through the supply device to the opening device.

9. The machine of claim 8, further comprising an axially reciprocateable outer sleeve over the supply device tube such that reciprocation of the sleeve causes vibration facilitating entry of pistachios into the tube.

10. The machine of claim 8, further comprising a double door system for retaining a pistachio at an exit from the tube for depositing one pistachio in each radial chamber of the disc.

11. The machine of claim 9, wherein the outer sleeve has an upper end which is bell-mouthed in shape for aiding entry of pistachios into the tube;

a flexible tongue at the upper end of the sleeve positioned for impeding the entry of pistachios into the tube when the sleeve is reciprocated to an upper limit position.

12. The machine of claim 10, wherein the upper end of the tube has an oblique section shape and the tongue is located to coincide with the lower portion of the oblique section of the upper end of the tube.

13. The machine of claim 8, further comprising an axially reciprocateable outer sleeve over the supply device tube such that reciprocation of the sleeve causes vibration facilitating entry of pistachios into the tube;

a double door system for retaining a pistachio at an exit from the tube for depositing one pistachio in each radial chamber of the disc; and a pneumatic system at the tubes for clearing a jam produced by the pistachios in the tube.

14. The machine of claim 13, wherein the outer sleeve has an upper end which is bell-mouthed in shape for aiding entry of pistachios into the tube;

a flexible tongue at the upper end of the sleeve positioned for impeding the entry of pistachios into the tube when the sleeve is reciprocated to an upper limit position; and the upper end of the tube has an oblique section shape and the tongue is located to coincide with the lower portion of the oblique section of the upper end of the tube.

15. The machine of claim 8, further comprising a pneumatic system at the tubes for clearing a jam produced by the pistachios in the tube.

16. The machine of claim 13, wherein the pneumatic system for clearing a pistachio jam in the tube comprises a first orifice in the outer sleeve and a longitudinal groove in the wall of the tube and coinciding with the first orifice;

a second orifice at the exit from the tube;

means for supplying pressurized air into at least one of the orifices for expelling a pistachio jammed in the tube away from the disc.

17. The machine of claim 16, further comprising a sensor in the opening device for detecting that a radial opening chamber is empty and connected with the pneumatic system for operating the pneumatic system detecting that the radial opening chamber is empty.

* * * * *